United States Patent
Sipe

(10) Patent No.: US 9,154,761 B2
(45) Date of Patent: Oct. 6, 2015

(54) CONTENT-BASED VIDEO SEGMENTATION

(71) Applicant: Google Inc., Mountain View, CA (US)

(72) Inventor: Michael Andrew Sipe, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 102 days.

(21) Appl. No.: 13/970,553

(22) Filed: Aug. 19, 2013

(65) Prior Publication Data

US 2015/0050006 A1     Feb. 19, 2015

(51) Int. Cl.
| | |
|---|---|
| *H04N 5/93* | (2006.01) |
| *H04N 5/92* | (2006.01) |
| *G11B 27/00* | (2006.01) |
| *H04N 9/87* | (2006.01) |
| *G06K 9/00* | (2006.01) |
| *G11B 27/031* | (2006.01) |
| *G11B 27/28* | (2006.01) |
| *H04N 5/14* | (2006.01) |
| *H04N 21/845* | (2011.01) |
| *G11B 7/246* | (2013.01) |
| *G06F 17/30* | (2006.01) |

(52) U.S. Cl.
CPC .............. *H04N 9/87* (2013.01); *G06K 9/00711* (2013.01); *G11B 27/031* (2013.01); *G11B 27/28* (2013.01); *H04N 5/147* (2013.01); *H04N 21/8456* (2013.01); *G06F 17/30793* (2013.01)

(58) Field of Classification Search
USPC .......................... 386/278, 280, 282, 326, 353
See application file for complete search history.

(56) References Cited

U.S. PATENT DOCUMENTS

| | | | |
|---|---|---|---|
| 5,136,655 | A | 8/1992 | Bronson |
| 6,711,587 | B1 | 3/2004 | Dufaux |
| 7,110,047 | B2 | 9/2006 | McGee et al. |
| 7,548,565 | B2 * | 6/2009 | Sull et al. ..................... 370/503 |
| 7,881,505 | B2 | 2/2011 | Schneiderman et al. |
| 7,986,372 | B2 | 7/2011 | Ma et al. |
| 8,196,045 | B2 | 6/2012 | Chandratillake et al. |
| 8,316,301 | B2 | 11/2012 | Kim et al. |
| 2006/0110128 | A1 | 5/2006 | Dunton et al. |

(Continued)

FOREIGN PATENT DOCUMENTS

| | | |
|---|---|---|
| EP | 1 376 584 A2 | 1/2004 |
| EP | 1 986 128 A3 | 11/2013 |
| WO | 2005043910 A1 | 5/2005 |
| WO | 2011009101 A1 | 1/2011 |

OTHER PUBLICATIONS

Wactlar et al. "Intelligent Access to Digital Video: Informedia Project", IEEE May 1996, pp. 46-52.

(Continued)

*Primary Examiner* — Daquan Zhao
(74) *Attorney, Agent, or Firm* — Shumaker & Sieffert, P.A.

(57) ABSTRACT

In general, video segmentation techniques are described. According to various examples, the video segmentation techniques may be based on video content. An example method includes determining one or more segments into which to divide video content, dividing the video content into the determined number of segments identifying a boundary frame associated with each of the segments, and adjusting the respective boundary frame associated with a first segment of the segments to generate an adjusted boundary frame associated with the first segment, wherein the adjusting is based on an one or more entity representations associated with the adjusted boundary frame.

20 Claims, 4 Drawing Sheets

(56) References Cited

U.S. PATENT DOCUMENTS

| | | |
|---|---|---|
| 2007/0030391 A1 | 2/2007 | Kim et al. |
| 2010/0150526 A1 | 6/2010 | Rose et al. |
| 2012/0090009 A1 | 4/2012 | Cook et al. |
| 2012/0263433 A1 | 10/2012 | Mei et al. |
| 2013/0294642 A1* | 11/2013 | Wang et al. ............ 382/103 |

OTHER PUBLICATIONS

Liu et al., "Video Shot Boundary Detection with Local Feature Post Refinement," ICSP 2008 Proceedings, Oct. 26, 2008, 4 pp.

International Search Report and Written Opinion of International Application No. PCT/US2014/047270, mailed Nov. 12, 2014 12 pp.

* cited by examiner

CONTENT-BASED VIDEO SEGMENTATION

BACKGROUND

A variety of devices, such as desktop and laptop computers, tablet computers, mobile phones, optical disc players, televisions, and television set-top boxes, may be capable of outputting video data. Such devices may also enable a user to begin, or resume, playing a video file at particular junctures within the content of the video file. In one example, a device may receive user input to select a predefined segment, or "chapter" of the video, at which to begin playing the video file.

SUMMARY

In one example, a method includes determining, by a computing device, one or more segments into which to divide video content, and dividing, by the computing device, the video content into the one or more segments. The method further includes identifying, by the computing device, a boundary frame associated with each of the segments, and adjusting, by the computing device, the respective boundary frame associated with a first segment of the segments to generate an adjusted boundary frame associated with the first segment, wherein the adjusting is based on one or more entity representations associated with the adjusted boundary frame.

In another example, a device includes a memory, and one or more programmable processors. The programmable processor(s) are operable to determine a number of segments into which to divide video content, and to divide the video content into the determined number of segments. The programmable processor(s) are further operable to identify a boundary frame associated with each of the segments, and to adjust the respective boundary frame associated with a first segment of the segments to generate an adjusted boundary frame associated with the first segment, wherein the adjusting is based on one or more entity representations associated with the adjusted boundary frame.

In another example, a computer-readable storage device is encoded with instructions. When executed, the instructions cause a computing device to perform operations. The operations include determining a number of segments into which to divide video content, and dividing the video content into the determined number of segments. The operations further include identifying a boundary frame associated with each of the segments, and adjusting the respective boundary frame associated with a first segment of the segments to generate an adjusted boundary frame associated with the first segment, wherein the adjusting is based on one or more entity representations associated with the adjusted boundary frame.

The details of one or more examples of the disclosure are set forth in the accompanying drawings and in the description below. Other features, objects, and advantages of the disclosure will be apparent from the description and drawings, and from the claims.

DETAILED DESCRIPTION

Figure 1:
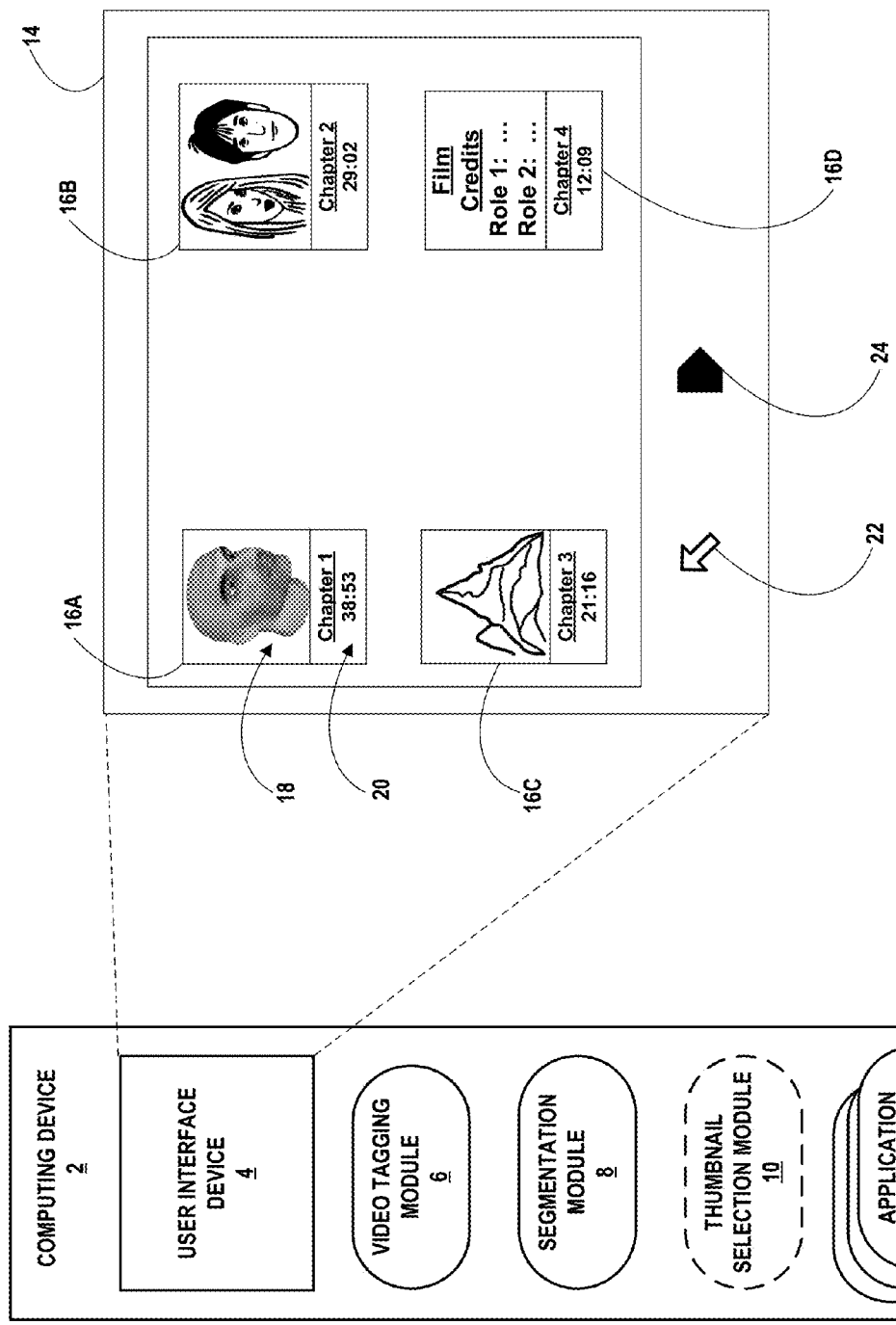
FIG. 1 is a block diagram illustrating details of a computing device and a user interface (UI) that includes representations of a segmented video, in accordance with one or more aspects of this disclosure.

A computing device, or programs executing on the computing device, may play or otherwise output video content, such as a movie. More specifically, the computing device may play a video by displaying a sequence of images (or "video frames"). Each frame may be associated with a particular time of a video, based on the frame rate of the video (e.g., frames per second or frames per minute). Additionally, the computing device may segment the video, so as to provide a viewer with segments, or "chapters" of the video, enabling the viewer to select and play a particular chapter. In some examples, the computing device may segment a video into chapters of equal length, where the length, for example, is expressed in terms of time units or frame count. In other examples, the computing device may segment the video into chapters that are determined manually, such as by an administrator who determines chapters based on the storyline, or other facets of the video.

In general, techniques of this disclosure are directed to segmenting a video into chapters, automatically, by a computing device. In some implementations, the computing device may receive an input defining a number of chapters into which to segment the video. In one such implementation, the computing device may segment the video into the indicated number of segments, such that all of the resulting segments are of equal length. More specifically, the computing device may demarcate the various segments, or mark intersegment transitions, by designating one or more "boundary frames" at each intersegment transition.

In turn, the computing device may detect events associated with frames of the video, based on actors entering and/or leaving a field of vision at a respective frame. Additionally, the computing device may determine an activity level associated with each event, based on a total turnover of actors at the event. In some examples, the computing device may determine events and corresponding activity levels based on tagged actors. If the computing device detects a frame associated with a particular activity level, the computing device may set the detected frame as a boundary frame. More specifically, the computing device may adjust an existing segment boundary to coincide with the new boundary frame. By setting the boundary frame to coincide with a frame having a particular activity level, the computing device may use the activity level as a criterion in video segmentation, in accordance with one or more aspects described herein.

The techniques of this disclosure may provide one or more potential advantages. For instance, a device implementing the techniques may determine segments or chapters of a video, based on such criteria as activity levels of various frames. More specifically, the device may perform the segmentation automatically, while avoiding potentially rigid segmentation schemes associated with other automatic segmentation techniques. Additionally, because the device may automatically perform video segmentation, the device may mitigate or eliminate the potentially cumbersome manual effort otherwise associated with segmentation.

FIG. 1 is a block diagram illustrating details of computing device 2 and user interface (UI) 14 that includes representations of a segmented video, in accordance with one or more aspects of this disclosure. Computing device 2 may include, be, or be part of one or more of a variety of types of devices including desktop computers, laptop computers (including so-called "netbooks" and "ultrabooks"), mobile phones (such as "smartphones"), personal digital assistants (PDAs), tablet computers, convertible laptop/tablet computers, watches, and various others. In some examples, computing device 2 may include, be, or be part of devices configured to stream various media, such as a television set-top box or set-top unit, a digital media receiver (also referred to as a media extender, media streamer, digital media hub, or digital media adapter), so-called "smart televisions" (also referred to as connected televisions or hybrid televisions), gaming consoles, and devices configured to generate removable storage devices, such as optical disc recorders, which include digital video disc (DVD) recorders or "burners."

As shown in the example of FIG. 1, various elements are shown as being included, stored, or otherwise implemented in computing device 2. In some examples, however, one or more of these elements may be included, stored, or otherwise implemented in one or more devices that are separate and distinct from computing device 2. In such examples, the one or more devices that are separate and distinct from computing device 2 are coupled (physically, communicatively, and/or operatively) to computing device 2. Computing device 2 may access functionalities of remotely implemented modules in implementing the video segmentation techniques of this disclosure. As one example implementation including remotely implemented functionalities, computing device 2 may represent a client device, and a server device may implement one or more of the illustrated modules.

As shown, computing device 2 may include user interface (UI) device 4. UI device 4 may represent any device or combination of devices that may provide or output UI 14 for display. Examples of UI device 4 may include a liquid crystal display (LCD) monitor, a light emitting diode (LED) monitor, a cathode ray tube (CRT) monitor, and a presence-sensitive device, such as a touchscreen. In examples where UI device 4 includes a presence-sensitive device, UI device 4 may also be configured or otherwise operable to receive user input by detecting a proximity of, or a contact with, an input object, such as a stylus or a user's finger.

In the example of FIG. 1, computing device 2 also includes application modules 12A-12N (collectively, "application modules 12"). Application modules 12 may be configured or otherwise operable to perform operations based on various stimuli, such as user input. As one example, one or more of application modules 12 may utilize UI device 4 to output UI 14 in various instances. Additionally, the relevant application module(s) 12 may receive user input, and generate output based on user input received by computing device 2. Application modules 12 may also communicate the output to a user through various facilities provided by computing device 2, such as by displaying the output in a readable format via UI device 4 (e.g., within UI 14). Application modules 12 may, in various instances, implement functionalities provided by a manufacturer of computing device 2, and/or functionalities provided by another party (often referred to as "third party applications").

Computing device 2 may generate UI 14, and in turn, enable UI device 4 to display UI 14. Computing device 2 may generate and/or modify UI 14 based on data received, processed, and/or generated by various modules or components of computing device 2. In the example of FIG. 1, computing device 2 may generate UI 14 to include several elements, such as chapter links 16A-16D (collectively, "chapter links 16"), play button 24, and cursor 20. More specifically, computing device 2 may move cursor within UI 14 responsive to user input received via an input device such as a mouse, touchpad, stylus, game controller, or remote control. In turn, computing device 2 and/or UI device 4 may enable the user to select or activate various elements of UI 14 by placing cursor 20 over the element, and providing a selection input, such as a click, an actuation of a button/stick, or a tap gesture.

Additionally, computing device 2 may generate each of chapter links 16 to include various sub-elements. As shown, chapter link 16A includes thumbnail 18 and data label 20. It will be appreciated that each of chapter links 16B-16D may also include sub-elements corresponding to thumbnail 18 and data label 20, but for ease of illustration purposes only, these sub-elements are not called out with respect to chapter links 16B-16D.

In the implementation illustrated in FIG. 1, computing device 2 includes video tagging module 6. Video tagging module 6 may identify various representations included in a video file to be segmented. As some examples, video tagging module 6 may identify representations of a particular person, location, or object included in the video file, or of an audio entity, such as a song, that is associated with the video file. In instances of tagging visual or graphical representations of people, such as an actor, athlete, or musician, represented in a video file, video tagging module 6 may implement facial recognition technology to tag each visual representation of a particular person in the video file.

It will be appreciated that video tagging module 6 may not perform tagging with respect to every person who is visually represented in the video. Instead, video tagging module 6 may tag a subset of the people who are visually represented in the video, such as actors who play at least a significant role in movie. In some examples, video tagging module 6 may identify the actors to be tagged in a movie based on criteria, such as role significance. For instance, video tagging module 6 may determine role significance based on whether or not an actor is visually represented in the video for at least a threshold number of frames (corresponding to the actor's "screen-time" in the video). In these and other examples, video tagging module 6 may identify actors to be tagged based on received instructions, such as via user input, or from instructions received from other components of computing device 2, or from a remote device with which computing device 2 is communicatively coupled.

More specifically, video tagging module 6 may receive or otherwise identify control images associated with each actor to be tagged. In turn, video tagging module 6 may compare facial images in various frames of the video to each control image, using facial recognition technology. If video tagging module 6 determines, based on the facial recognition comparison, that a facial image in a frame matches one of the identified control images within an acceptable margin of error, video tagging module 6 may determine that the frame includes a representation of a pre-identified actor. Particularly, in this scenario, video tagging module 6 may determine that the frame includes a visual representation of the particular actor who is represented in the matching control image.

In turn, video tagging module 6 may mark, flag, or otherwise identify the frame as including the representation of the actor. Such identification performed by video tagging module 6 is referred to herein as "tagging" actors in frames. In specific scenarios, video tagging module 6 may tag a consecutive or contiguous sequence of frames for a single actor, where the sequence of frames maps to a continuous appearance of the actor in the video. Additionally, video tagging module 6 may tag multiple actors within a single frame, if a particular frame includes facial images that match more than of the identified control images.

As a result, in some scenarios, video tagging module 6 may tag overlapping, but not identical, frame sequences with respect to different actors. As one example, video tagging module 6 may tag a first actor in a frame sequence associated with the 00:00:01 to 00:10:00 range of a video, where the example values are expressed in [hour:minute:second] format. Additionally, according to this example, video tagging module 6 may tag a second actor in a frame sequence associated with the 00:05:00 to 00:15:00 range of the video. In this example, the tags for the first and second actors overlap in the 00:05:00 to 00:10:00 range of the video. In this manner, video tagging module 6 may tag multiple actors at various ranges of the video, thereby generating overlapping, but not necessarily identical, tag sequences for various actors.

As illustrated in FIG. 1, computing device 2 may also include segmentation module 8. Segmentation module 8 may be configured or otherwise operable to perform one or more of the video segmentation techniques described herein. In examples, segmentation module 8 may use data provided or generated by video tagging module 6 in segmenting video content, such as a video file stored to, or otherwise accessible via, computing device 2. In some examples, segmentation module 8 may determine a number of segments into which to divide the video content. The number is denoted herein by the variable 'N.' Segmentation module 8 may determine the value of N in various ways, such as by receiving the value via user input, receiving the value from a server device, or by setting N to a predefined default value.

In examples, segmentation module 8 may divide the video content into a total of N equal-length segments. As described herein, the resulting equal-length segments may each have a frame count corresponding to a timespan of 'T' seconds of the video. In other examples, segmentation module 8 may divide the video content into N segments, such that at least two of the resulting segments are of unequal length. In various examples of unequal-length division, segmentation module 8 may divide the video by demarcating intersegment transitions at random points, or by approximating the equal-length division to place intersegment transitions at certain timing markers in the video content, or to ensure that the transition does not intersect a single frame.

More specifically, segmentation module 8 may designate the first frame and/or the last frame of a resulting segment as a "scene boundary" or "chapter boundary" for the respective segment. More specifically, segmentation module 8 may designate a frame as a chapter boundary, to indicate the point of an intersegment transition. In the case of the first frame of a segment, the chapter boundary may indicate a transition into the current segment, e.g., from a preceding segment. Conversely, in the case of the last frame of a segment, the chapter boundary may indicate a transition out of the current segment, e.g., to a successive segment.

Additionally, segmentation module 8 may detect events at particular frames, or frame transitions, of the video, based on detecting one or more actors that enter or leave the field of vision at a frame transition. In some examples, segmentation module 8 may detect events by using tagging data generated by video tagging module 6. More specifically, in these examples, segmentation module 8 may detect an event at each frame transition that indicates that a tagged actor has either entered the field of vision, or exited the field of vision. For instance, segmentation module 8 may detect that video tagging module 6 has tagged "actor_one" as being present in frame_ten of the video, but frame_eleven of the video does not include a tag for actor_one. In this scenario, segmentation module 8 may detect an event, with respect to actor_one leaving the field of vision, at frame_eleven.

By detecting individual events in the manner described, segmentation module 8 may identify frame transitions that indicate events having different magnitudes. In some examples, segmentation module 8 may identify a frame transition at which multiple actors leave the field of vision. In one such example, segmentation module 8 may determine that the frame transition also indicates that a different set of one or more actors enter the field of vision. For instance, a single frame transition may indicate that actors one-through-three leave the field of vision, and that actors four-through-ten enter the field of vision. The magnitude of an event detected by segmentation module 8 is referred to herein as the "activity level" for the respective event.

Although described above with respect to actors tagged by video tagging module 6, it will be appreciated that segmentation module 8 may implement one or more of the described functionalities to actors represented in the video, regardless of whether video tagging module 6 has tagged the actor(s). In some examples, segmentation module 8 may implement one or more tracking techniques, such as by determining the continuous appearance of the face of an actor over time (e.g., across contiguous frames of the video). Based on whether an actor appears continuously across multiple contiguous frames, segmentation module 8 may detect events triggered by entry or departure of the actor from the field of vision. In various examples, segmentation module 8 may implement techniques including one or more of detection (e.g., face detection) and motion modeling (e.g., based on one or more motion models), to determine events with respect to untagged actors.

Additionally, segmentation module 8 may determine the activity levels of any detected events, within a particular frame range of each chapter boundary. More specifically, segmentation module 8 may determine activity levels of frames that are positioned within a particular range before and/or after each chapter boundary. If segmentation module 8 detects a frame that is associated with a particular event activity level, then segmentation module 8 may set the chapter boundary to the detected frame with the particular event activity level. By setting the chapter boundary to a proximate frame that exhibits a certain activity level, segmentation module 8 may move the intersegment transition to a point of the video that is associated with a significant change in the context of the video. More specifically, the greater activity level caused by high actor turnover may indicate a transition between potentially distinct portions of the substantive content of the video. As one specific use case, if the video is associated with a movie, a high actor turnover may indicate a change between sub-plots of the movie.

In turn, segmentation module 8 may set the chapter boundary to such a frame, within a predetermined range of the originally set boundary, to coincide with a potential transition in the substantive content of the video. In the movie use case described above, by setting the chapter boundary to a high activity level frame, segmentation module 8 may begin the next segment of the movie at the beginning of a different sub-plot being addressed. In this manner, segmentation module 8 may implement techniques of this disclosure to set chapter boundaries to coincide with video content transitions, thereby potentially generating chapters that more closely track the substantive content of the video.

In the example implementation illustrated in FIG. 1, computing device 2 may optionally include thumbnail selection module 10. Thumbnail selection module 10 is illustrated in FIG. 1 with dashed line borders to indicate the optional nature of thumbnail selection module 10. Thumbnail selection module 10 may be configured or otherwise operable to select a representative frame for a particular segment of the video. More specifically, thumbnail selection module 10 may select a frame that is included in a particular segment to represent that particular segment.

According to some implementations, thumbnail selection module 10 may use data generated by segmentation module 8 in selecting the representative frame for a particular segment. For instance, thumbnail selection module 10 may identify segments of the video based on the chapter boundaries that are set by segmentation module 8. Additionally, in some examples, thumbnail selection module 10 may select, as the representative frame for a given segment, one of the chapter boundary frames that segmentation module 8 sets for the given segment.

In various examples, thumbnail selection module 10 may randomly select one of the two chapter boundaries (e.g., the starting and ending frames) of the segment, as determined by segmentation module 8. In other examples, thumbnail selection module 10 may determine which of the two chapter boundaries is associated with a higher activity level, based on the tag data generated by video tagging module 6, and select the representative frame based on any difference in the activity levels. In still other examples, thumbnail selection module 10 may search a greater portion of the segment than the frame range searched by segmentation module 8, and, for instance, select the representative frame to be the frame of the segment with the highest activity level.

Additionally, computing device 2 and/or various components thereof may generate UI 14, and cause UI device 4 to output UI 14. Segmentation module 8 may set, or adjust, the chapter boundaries, to generate video segments of varying lengths, as expressed by time units or frame counts. Each of chapter links 16 includes an indication of the time length, indicated in [minute:second] format, for the corresponding segment generated by segmentation module 8. For instance, data label 20 of chapter link 16A indicates that the corresponding segment ("chapter 1") of the video has a playing length of 38 minutes and 53 seconds. Similarly, chapter links 16B-16D are associated with chapters 2-4 of the video, which have playing lengths of 29 minutes and 2 seconds, 21 minutes and 16 seconds, and 12 minutes and 9 seconds, respectively.

Chapter link 16A also includes thumbnail 18. In examples, thumbnail 18 may include a downscaled version of a representative frame that thumbnail selection module 10 selects with respect to chapter 1 of the video. As shown, each of chapter links 16 includes a different thumbnail, with varying levels of actor representation. For instance, one or both of segmentation module 8 and thumbnail selection module 10 may determine that the single actor of thumbnail 18 represents the highest activity level within a particular number of frames considered for boundary setting and/or representative frame selection.

As another example, one or both of segmentation module 8 and thumbnail selection module 10 may determine that the searched frames of chapter 3 do not include sufficient actor-based activity. As a result, thumbnail selection module 10 may select, with respect to chapter 3, a representative frame that does not include any visual representation of an actor. In other implementations, computing device may generate chapter links 16 to include additional information, such as the starting time marker for the respective segment, a chapter title, names of actors/characters represented in the chapter, and others. In some implementations where computing device 2 does not include thumbnail selection module 10, chapter links 16 may not include thumbnails of the representative frames (e.g., chapter link 16A may not include thumbnail 18).

In turn, computing device 2 may output a particular chapter of the video via UI device 4 based on user input received with respect to one or more of chapter links 16. For instance, computing device 2 may detect that a user has placed cursor 22 over one of chapter links 16, and selected the respective chapter link 16, via click, tap, or actuation input. Additionally, computing device 2 may detect that a user has activated play button 24 via an input. In response, computing device 2 may output, via UI device 4, the video, starting at the beginning of the currently selected chapter. If computing device 2 detects a user activation of play button 24 when no chapter is currently selected, computing device 2 may begin output of the video from a default starting frame, such as the first frame of chapter 1.

Figure 2:
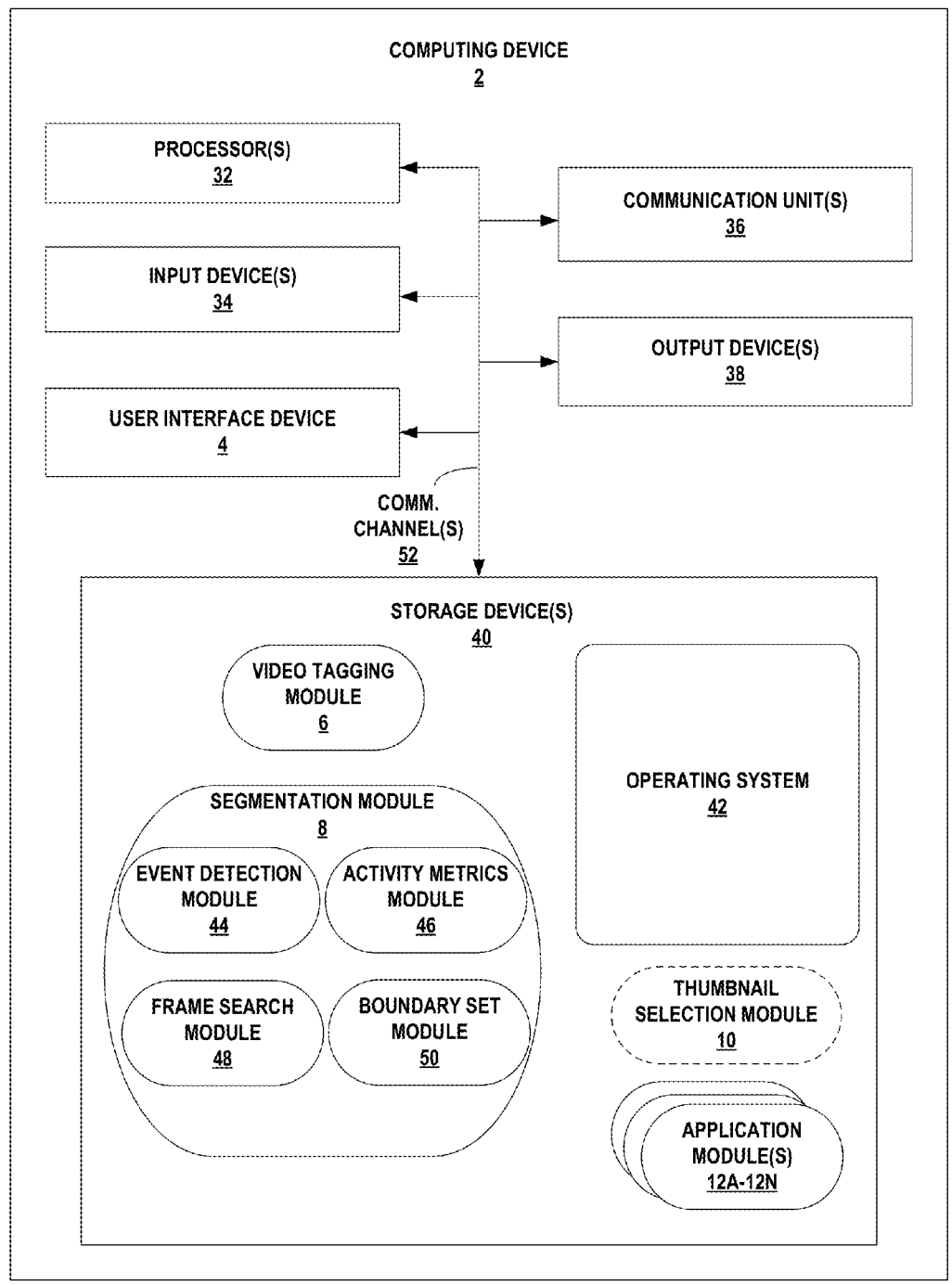
FIG. 2 is a block diagram illustrating further details of one example implementation of a computing device operable to segment video, in accordance with one or more aspects of this disclosure.

FIG. 2 is a block diagram illustrating further details of one example implementation of computing device 2 operable to segment video, in accordance with one or more aspects of this disclosure. Commonly numbered elements of FIGS. 1 and 2 may operate similarly. For ease of discussion, only those elements with different element numbers from FIG. 1 are described with respect to FIG. 2. It will be appreciated that other implementations of computing device 2 shown in FIG. 1 may perform one or more techniques of this disclosure, and that different implementations may be used in various instances. Although shown in FIGS. 1 and 2 as a stand-alone computing device 2 for purposes of example, computing device 2 may be any component or system that includes a processor (e.g., processor(s) 32), or other suitable computing environment for executing software instructions and, for example, need not include one or more of the elements shown in FIG. 2 (e.g., input devices 34, UI device 4, output devices 38).

As shown in the example of FIG. 2, computing device 2 may include one or more processors 32, one or more input devices 34, one or more communication units 36, one or more output devices 38, one or more storage devices 40, and user interface (UI) device 4. Computing device 2, in one implementation, further includes application modules 12A-12N and operating system 42, which are executable by computing device 2. Each of components 4, 32, 34, 36, 38, and 40 may be interconnected (physically, communicatively, and/or operatively) for inter-component communications. In some examples, communication channel(s) 52 may include a system bus, network connection, inter-process communication data structure, or any other channel for communicating data. As one example in FIG. 2, components 4, 32, 34, 36, 38, and 40 may be coupled by one or more communication channel(s) 52. Application modules 12 and operating system 42 may also communicate information with one another as well as with other components in computing device 2.

Processor(s) 32, in one example, are configured to implement functionality and/or process instructions for execution within computing device 2. For example, processor(s) 32 may be capable of processing instructions stored in storage device(s) 40. Examples of processor(s) 32 may include any one or more of a microprocessor, a controller, a digital signal processor (DSP), an application specific integrated circuit (ASIC), a field-programmable gate array (FPGA), or equivalent discrete or integrated logic circuitry.

One or more storage devices 40 may be configured to store information within computing device 2 during operation. Storage device(s) 40, in some examples, are described as one or more computer-readable storage medium/media and/or as one or more computer-readable storage devices. In some examples, storage devices 40 comprise temporary memory, meaning that a primary purpose of storage device(s) 40 is not long-term storage. Storage device(s) 40, in some examples, are described as a volatile memory, meaning that storage device(s) 40 do not maintain stored contents when the computer is turned off. Examples of volatile memories include random access memories (RAM), dynamic random access memories (DRAM), static random access memories (SRAM), and other forms of volatile memories known in the art. In some examples, storage device(s) 40 are used to store program instructions for execution by processor(s) 32. Storage device(s) 40, in one example, are used by software or applications running on computing device 2 (e.g., application modules 12) to temporarily store information during program execution.

Storage device(s) 40, in some examples, also include one or more computer-readable storage media. Examples of such computer-readable storage media may include a non-transitory computer-readable storage medium, and various computer-readable storage devices. Storage device(s) 40 may be configured to store larger amounts of information than amounts that may be stored to various forms of volatile memory. Storage device(s) 40 may further be configured for long-term storage of information. In some examples, storage device(s) 40 include non-volatile storage elements. Examples of such non-volatile storage elements include magnetic hard discs, solid state discs (SSDs), optical discs, floppy discs, flash memories, or forms of electrically programmable memories (EPROM) or electrically erasable and programmable (EEPROM) memories.

Computing device 2, in some examples, also includes one or more communication units 36. Computing device 2, in one example, utilizes communication unit 36 to communicate with external devices via one or more networks, such as one or more wireless networks. Communication unit 36 may be a network interface card, such as an Ethernet card, an optical transceiver, a radio frequency transceiver, or any other type of device that can send and receive information. Other examples of such network interfaces may include Bluetooth®, 3G, 4G, and WiFi® radios computing devices as well as Universal Serial Bus (USB). In some examples, computing device 2 utilizes communication unit 36 to wirelessly communicate with an external device.

Computing device 2, in one example, also includes one or more input devices 34. Input device(s) 34, in various examples, are configured to receive input from a user through tactile, audio, or video feedback. Examples of input device(s) 34 include a presence-sensitive device (such as a presence-sensitive display), a mouse, a keyboard, a voice responsive system, video camera, microphone or any other type of device for detecting a command from a user. In some examples, a presence-sensitive display includes a touch-sensitive screen.

One or more output devices 38 may also be included in computing device 2. Output device(s) 38, in some examples, are configured to provide output to a user using tactile, audio, or video stimuli. Output device(s) 38, in various examples, include a presence-sensitive display (e.g., a touch-sensitive screen), a sound card, a video graphics adapter card, or any other type of device for converting a signal into an appropriate form understandable to humans or machines. Additional examples of output device(s) 38 include a speaker, a cathode ray tube (CRT) monitor, a liquid crystal display (LCD), or any other type of device that can generate output that is intelligible to a user.

In some examples, UI device 4 may include functionality of input device(s) 34 and/or output device(s) 38. In the example of FIG. 2, UI device 4 may include, be, or be part of a presence-sensitive display and/or presence-sensitive input device. In some examples, a presence-sensitive display and/or a presence-sensitive input device may detect an object at and/or near the respective display or input device. As one non-limiting example range, a presence-sensitive display may detect an object, such as a finger or stylus, which is within two inches or less of the physical screen of the presence-sensitive display. The presence-sensitive display may determine a location (e.g., an (x,y) coordinate set) of the presence-sensitive display at or near which the object was detected. In another non-limiting example range, a presence-sensitive display may detect an object 6 inches or less from the physical screen of the presence-sensitive display, and other ranges are also possible. The presence-sensitive display may determine the location selected by the object (e.g., user's finger) using capacitive, inductive, and/or optical recognition techniques. In some examples, the presence-sensitive display provides output using tactile, audio, or video stimuli as described with respect to output device 38.

Computing device 2 may include operating system 42. Operating system 42, in some examples, controls the operation of components of computing device 2. For example, operating system 42, in one example, facilitates the communication of application module(s) 12 with processor(s) 32, communication unit(s) 36, storage device(s) 40, input device(s) 34, and output device(s) 38. As shown in FIG. 2, storage device(s) 40 may include video tagging module 6, segmentation module 8, and optionally, thumbnail selection module 10, as described in FIG. 1. In turn, in the example of computing device 2 illustrated in FIG. 2, segmentation module 8 includes sub-modules, namely, event detection module 44, activity metrics module 46, frame search module 48, and boundary reset module 50. Various modules illustrated in FIG. 2 may each include program instructions and/or data that are executable or otherwise usable by computing device 2. As one example, segmentation module 8 and/or sub-modules thereof may include instructions that cause computing device 2 to perform one or more of the operations and actions described in the present disclosure.

As described with respect to FIG. 1, video tagging module 6 may identify various representations people, locations, or objects included in the video file, or of an audio entity, such as a song, that is associated with the video file. In instances of tagging visual or graphical representations of people, video tagging module 6 may use facial recognition technology to compare a facial representation detected in a frame to a reference image of a person, such as an actor or athlete. In various examples, video tagging module 6 may perform the comparison using one or more algorithms, such as geometric and/or photometric approaches, three-dimensional (3D) modeling and recognition techniques, principal component analysis using eigenfaces, linear discriminate analysis, elastic bunch graph matching, pattern matching, and dynamic link matching, to name just a few.

Based on comparison-based values yielded by the applied algorithm(s), such as preprogrammed acceptable margins of error, video tagging module 6 may determine whether or not the facial representation in a frame is sufficiently similar to the reference facial image. Video tagging module 8 may apply these or corresponding comparison-based techniques to recognize other types of visual representations in video frames, such as representations of particular objects, or locations, such as a city, based on the skyline of the city. Similarly, in instances of identifying audio data associated with one or more of the video frames, such as a song, speech associated with an off-screen actor, or a narration, video tagging module 6 may use various identification technologies applicable to audio data. Examples of identification technologies applicable to audio data include voice recognition and acoustic fingerprinting.

As shown in FIG. 2, segmentation module 8 may include one or more sub-modules. Each sub-module of segmentation module 8 may be configured or otherwise operable to implement various portions of functionalities described herein with respect to segmentation module 8. While the sub-modules of segmentation module 8 are described herein as implementing specific portions of the functionalities of segmentation module 8 for ease of discussion and illustration, it will be appreciated that, in other implementations in accordance with this disclosure, different allocations of the functionalities among the sub-modules are possible.

In the example implementation illustrated in FIG. 2, segmentation module 8 includes event detection module 44, activity metrics module 46, frame search module 48, and boundary set module 50. Event detection module 44 may be configured or otherwise operable to detect events represented in the video file, based on one or more tagged actors entering or leaving the field of vision with respect to a frame transition in the video file. For instance, event detection module 44 may detect an event with respect to each frame transition at which at least one tagged actor enters, or at least one tagged actor leaves, the field of vision. An event detected by event detection module 44 with respect to a frame transition may be denoted herein by the term 'e_t.'

Although described above with respect to actors tagged by video tagging module 6, it will be appreciated that event detection module 44 may implement one or more of the described functionalities to actors represented in the video, regardless of whether video tagging module 6 has tagged the actor(s). In some examples, event detection module 44 may implement one or more tracking techniques, such as by determining the continuous appearance of the face of an actor over time (e.g., across contiguous frames of the video). Based on whether an actor appears continuously across multiple contiguous frames, event detection module 44 may detect events triggered by entry or departure of the actor from the field of vision. In various examples, event detection module 44 may implement techniques including one or more of detection (e.g., face detection) and motion modeling (e.g., based on one or more motion models), to determine events with respect to untagged actors.

Activity metrics module 46 of segmentation module 8 may be configured or otherwise operable to determine an activity level associated with each event (e_t) detected by event detection module 44. More specifically, activity metrics module 46 may determine the activity level for a particular event, based, in one example, on the sum of the number of tagged actors that enter the field of vision, and the number of tagged actors that leave the field of vision, with respect to a particular frame transition. Applying an example (yet non-limiting) scenario described above with respect to FIG. 1, a particular frame transition may represent three tagged actors leaving the field of vision. In this scenario described above, the same frame transition may represent seven tagged actors entering the field of vision. In this example, activity metrics module 46 may determine that the event at the frame transition is associated with an activity level of ten. More specifically, activity metrics module 46 may calculate the activity level of the event by summing the total number of tagged actors entering the field of vision and the total number of actors leaving the field of vision at the frame transition. The activity level determined by activity metrics module with respect to an event may be denoted herein by the expression 'D(e_t)' where e_t references the particular event to which the activity level applies.

In some examples, activity metrics module 46 may augment the activity level calculation with data pertaining to tagged actors who are static with respect to the frame transition. For instance, in the example described above, where activity metrics module 46 calculates D(e_t) to be ten, activity metrics module 46 may adjust the calculated D(e_t) based on a number of tagged actors that remain within the field of vision across the frame transition. In one non-limiting example, activity metrics module 46 may determine that two tagged actors remain within the field of vision through the frame transition. In this example, activity metrics module 46 may decrement the calculated D(e_t) value by two, resulting in an adjusted D(e_t) value of eight.

In another example of an augmented D(e_t) calculation, activity metrics module 46 may determine that the number of tagged actors who are static across the frame transition exceeds the original D(e_t) value. For instance, activity metrics module 46 may determine that a total of fifteen tagged actors remain in the field of vision, across the frame transition. In other words, activity metrics module 46 may determine that both the pre-transition frame and the post-transition frame share a total of fifteen tagged actors within the respective fields of vision. It will be appreciated that activity metrics module 46 may detect that the pre- and post-transition frames share a tagged actor, even if video tagging module 6 tags the shared actor at different relative positions within the respective fields of vision of the pre- and post-transition frames.

Additionally, in this example, activity metrics module 46 may determine that the pre-augmentation D(e_t) value, e.g., the sum of the number of tagged actors that enter the frame and the number of tagged actors that leave the field of vision with respect to the frame transition, is ten. In this example, activity metrics module 46 may determine that the augmented D(e_t) value is zero, with respect to the frame transition. More specifically, activity metrics module 46 may augment the calculation by decrementing the original D(e_t) for each static tagged actor, stopping the decrementing when the augmented D(e_t) value reaches zero. In this specific example, because the number of tagged actors that are static across the frame transition exceeds the original D(e_t) value, activity metrics module 46 may stop decrementing once the augmented D(e_t) value reaches zero. As a result, activity metrics module 46 may set the augmented D(e_t) value to zero, in this example. As an example use case, activity metrics module 46 may determine that a greater number of static tagged actors outweighs any potential plot changes indicated by a lesser number of tagged actors that enter and/or leave the field of vision across the frame transition.

In another example of augmented D(e_t) calculation, activity metrics module 46 may determine that no tagged actors are static across the frame transition. For instance, activity metrics module 46 may determine that the pre-transition frame includes a total of three tagged actors in the field of vision, and that all three tagged actors are absent from the field of vision in the post-transition frame. Similarly, activity metrics module 46 may determine that the post-transition frame includes a total of seven tagged actors in the field of vision, and that none of the seven tagged actors is in the field of vision in the pre-transition frame. In this example, activity metrics module 46 may determine that the original D(e_t) value and the augmented D(e_t) are the same, e.g., a value of ten. More specifically, because activity metrics module 46 determines that no tagged actors are static across the frame transition, activity metrics module 46 may not augment the original D(e_t) value of ten (or alternatively, the augmentation process may include subtracting a value of zero from the original D(e_t) value). It will be appreciated that activity metrics module 46 may determine an augmented $D(e\_t)$ value in some implementations of the techniques described herein, while in other implementations, activity metrics module 46 may use the original, or "raw," $D(e\_t)$ value as the final $D(e\_t)$ value associated with a frame transition.

Frame search module 48 may be configured or otherwise operable to survey $D(e\_t)$ values of frames positioned within a particular range of a chapter boundary. For instance, frame search module 48 may survey the $D(e\_t)$ values of frames that follow a starting frame of a chapter, within a predetermined frame range. Similarly, frame search module 48 may survey the $D(e\_t)$ values of frames that precede an ending frame of a chapter, within a predetermined frame range. In some examples, frame search module 48 may identify a frame with the greatest $D(e\_t)$ value within the surveyed range. Frame search module 48 may identify the greatest $D(e\_t)$ value within a surveyed range of frames by applying one or more selection and/or sorting algorithms, such as linear maximum selection, bubble sort, and others.

In some examples, frame search module 48 may merge contiguous frame ranges, and survey the merged range. For instance, frame search module 48 may identify two contiguous chapter boundaries, such as the ending frame of a first chapter, and the starting bound of a second chapter that immediately follows the first chapter. Additionally, frame search module 48 may survey the merged frame range for the greatest $D(e\_t)$ value. More specifically, by surveying the merged range, frame search module 48 may determine the greatest $D(e\_t)$ value in the frame range, while maintaining a consistent number of chapters to be considered. For instance, by searching for and identifying a single frame with the greatest $D(e\_t)$ value, with respect to the inter-chapter transition defined by the neighboring chapter boundaries. By identifying a single frame with the greatest $D(e\_t)$ value, frame search module 48 may avoid detecting two frames, one having a greatest $D(e\_t)$ value in the range preceding the ending frame of the first chapter, and another having a greatest $D(e\_t)$ value in the range following the starting frame of the second chapter. In this manner, frame search module 48 may implement the techniques described herein to avoid identifying two separate frames with respect to an inter-chapter transition, and more specifically, to avoid identifying two frames that may be separated by one or more intervening frames in the video file.

According to some implementations of the techniques described herein, frame search module 48 may define the time range to survey as [T/4] time units from the chapter boundary, where 'T' denotes the timespan of the particular chapter. For instance, frame search module 48 may use a frame rate of the video (e.g., expressed in the unit "frames per second") to determine the number of frames included in the particular chapter. More specifically, frame search module 48 may multiply the frame rate by the timespan (e.g., expressed in seconds) of the chapter to obtain the total number of frames included in the chapter. In turn, frame search module 48 may divide the number of frames in the chapter by four to obtain the total number of frames to be surveyed, from each chapter boundary. As described, frame search module 48 may survey each frame range identified using the [T/4] formula for the greatest $D(e\_t)$ value, or, in applicable scenarios, may merge two contiguous frame ranges, and survey the merged range for the greatest $D(e\_t)$ value. In this example, the merged frame range may have a length denoted by [T/4] multiplied by a factor of two, or in other words, a length of [T/2]. Additionally, frame search module 48 may communicate, to boundary set module 50, an identification of the frame with the greatest $D(e\_t)$ value, for each surveyed frame range. Examples of the identification may include a frame number, a timestamp associated with the frame included in the video file, and others.

Boundary set module 50 may use data received from other components of computing device 2, such as a frame identification received from frame search module 48, to set or reset chapter boundaries, according to one or more aspects of this disclosure. For instance, boundary set module 50 may receive, from frame search module 48, an indication of a frame with the greatest $D(e\_t)$ value within a surveyed frame range. In turn, boundary set module 50 may set the chapter boundary associated with the surveyed frame range to the frame identified by frame search module 48.

More specifically, boundary set module 50 may determine that the surveyed frame range is associated with a single original chapter boundary. In one example, boundary set module 50 may identify the original chapter boundary based on proximity to the identified frame, such as by selecting the original chapter boundary that is most proximate to the identified frame. In another example, boundary set module 50 may receive an indication of the original chapter boundary associated with an identified frame, from frame search module 48 and/or other component(s) of computing device 2.

Additionally, boundary set module 50 may adjust the corresponding chapter boundary to coincide with the identified frame. For example, boundary set module 50 may set the identified frame as the starting frame of the second chapter associated with the inter-chapter transition. Additionally, boundary set module 50 may set a frame that immediate precedes the identified frame, as the ending frame of the first chapter associated with the inter-chapter transition. By adjusting the chapter boundary based on a frame identified by frame search module 48 as having the greatest $D(e\_t)$ value within a surveyed range, boundary set module 50 may implement the techniques described herein to adjust chapter boundaries to more accurately track transitions in the substantive content of the video file.

As in the example of FIG. 1, thumbnail selection module 10 is illustrated in FIG. 2 with dashed line borders to indicate the optional nature of thumbnail selection module 10. As described with respect to FIG. 1, thumbnail selection module 10 may be configured or otherwise operable to select a representative frame for a particular segment of the video. While thumbnail selection module 10 is described with respect to FIG. 1 in the context of selecting representative thumbnails for chapter selection, it will be appreciated that computing device 2 may apply the functionalities of thumbnail selection module 10 in other contexts, as well. As one example, computing device 2 may use a chapter-representative frame to generate promotional materials, such as a poster or other promotional image, associated with the video file.

Figure 3:
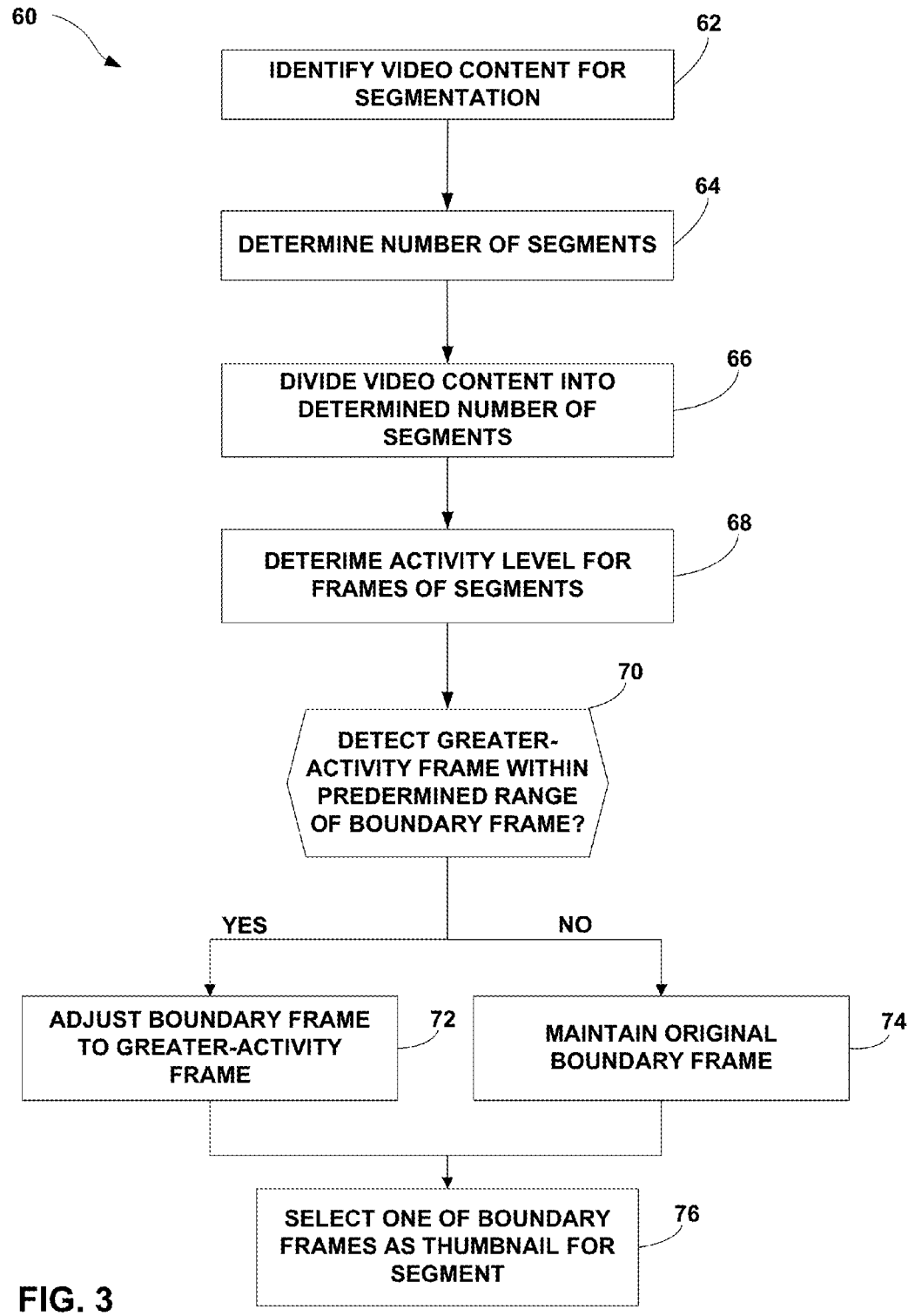
FIG. 3 is a flowchart illustrating an example process that a computing device may perform to segment video, in accordance with one or more aspects of this disclosure.

FIG. 3 is a flowchart illustrating an example process 60 that a computing device may perform to segment video, in accordance with one or more aspects of this disclosure. While process 60 may be performed by a variety of devices in accordance with the aspects of this disclosure, for purposes of clarity only, process 60 is described herein with respect to computing device 2 and components thereof, as illustrated in FIGS. 1-2.

Process 60 includes segmentation module 8 identifying video content for segmentation (62). In various examples, segmentation module 8 may identify the video content based on user input, based on an instruction received from another device (e.g., a server) that is communicatively coupled to computing device 2, and others. Additionally, in various examples, the identified video content may be stored locally to storage device(s) 40, may be received from another device communicatively coupled to computing device 2, and others.

In various examples, the video content may include, be, or be part of a data file, such as a video file conforming to one or more video file formats.

Additionally, segmentation module 8 may determine a number of segments ('N') into which to divide the identified video content (64). As some examples, segmentation module 8 may determine the number of segments based on user input indicating the number, an instruction from a remote device indicating the number, or by setting the number to a predefined default value. Segmentation module 8 may divide the identified video content into the determined number (N) of segments (66). In some examples, segmentation module 8 may divide the video content into N number of equal-length segments. For instance, segmentation module 8 may determine the length of a segment using various measures, such as a frame count, or the time denoted by a normal-rate output of the total frames in each segment. Segmentation module 8 and/or other components of computing device 2 may determine the normal rate of output of the video content, based on a frame rate or picture rate associated with the video content. The frame rate may be expressed in terms of frames or pictures per unit time, such as frames per second. The frame rate may also be expressed by devices, such as monitors equipped with progressive scan capabilities, in terms of hertz (Hz).

Activity metrics module 46 may determine the activity level, denoted by 'D(e_t)' herein, for the frames of the segments formed by segmentation module 8 (68). In particular, event detection module 44 may detect events, each instance of which is denoted by 'e_t' herein, with respect to each frame of the segments. More specifically, event detection module 44 may compare pre- and post-transition frames to determine whether one or more actors that are tagged by video tagging module 6 enter and/or leave a field of vision with respect to the frames. If event detection module 44 determines that at least one tagged actor enters or leaves the field of vision at the frame transition, event detection module 44 may detect an event with respect to the frame transition.

In turn, activity metrics module 46 may determine the D(e_t) value for each event detected by event detection module 44. More specifically, activity metrics module 46 may calculate the D(e_t) value for an event by summing the total number of tagged actors who enter the field of vision at the frame transition, with the total number of tagged actors who leave the field of vision at the frame transition. In some examples, if event detection module 44 does not detect an event with respect to a particular frame transition, activity metrics module 46 may assign a D(e_t) value of zero to the event-less frame transition.

Additionally, frame search module 48 may survey the D(e_t) values of frames that are positioned within a predetermined frame range of each chapter boundary. Based on the D(e_t) values detected within the surveyed frame ranges, frame search module 48 may determine whether an event with a greater D(e_t) value than the original chapter boundary is detected within the predetermined frame range (70). If frame search module 48 detects that the surveyed frame range includes a frame with a greater D(e_t) value than the original chapter boundary (YES' branch of 70), frame search module 48 may cause boundary set module 50 to adjust the chapter boundary to coincide with the frame having the greater D(e_t) value (72). Additionally, if frame search module 48 detects multiple frames within the surveyed range that each has a greater D(e_t) value than the original chapter boundary, frame search module 48 may cause boundary set module 50 to adjust the chapter boundary to coincide with the frame having the greatest D(e_t) value (e.g., the "peak" D(e_t) value) within the surveyed range.

On the other hand, if frame search module 48 does not detect a frame within the surveyed range having a greater D(e_t) value than the original chapter boundary (NO' branch of 70), frame search module 48 may cause boundary set module 50 to maintain the original chapter boundary (74). Additionally, thumbnail selection module 10 may select one of the chapter boundaries (e.g., either the starting frame or the ending frame) of the segment, as a representative thumbnail for the segment (76). In one example, process 60 may be described according to the following workflow, performed by computing device 2 and/or one or more components thereof:

1) Tag each appearance of each actor in the video.
2) Divide the video into N equal length (T seconds) scenes, defined by N−1 scene boundaries.
3) Define an event e_t at each time t when one or more actors enter or leave the video (as determined by step 1 of the workflow).
4) For each e_t, compute D(e_t)=number of actors entering+ the number of actors leaving.
5) For each scene boundary defined in step 2 of the workflow, search T/4 seconds before the boundary and T/4 seconds after the boundary for the event with the largest D value and reset the boundary to the corresponding time. In other words, search for the peak in D in a window of T/2 seconds about the boundary and reset the boundary to that point. If there are no events in the T/2 second window, leave the boundary as it is.

Figure 4:
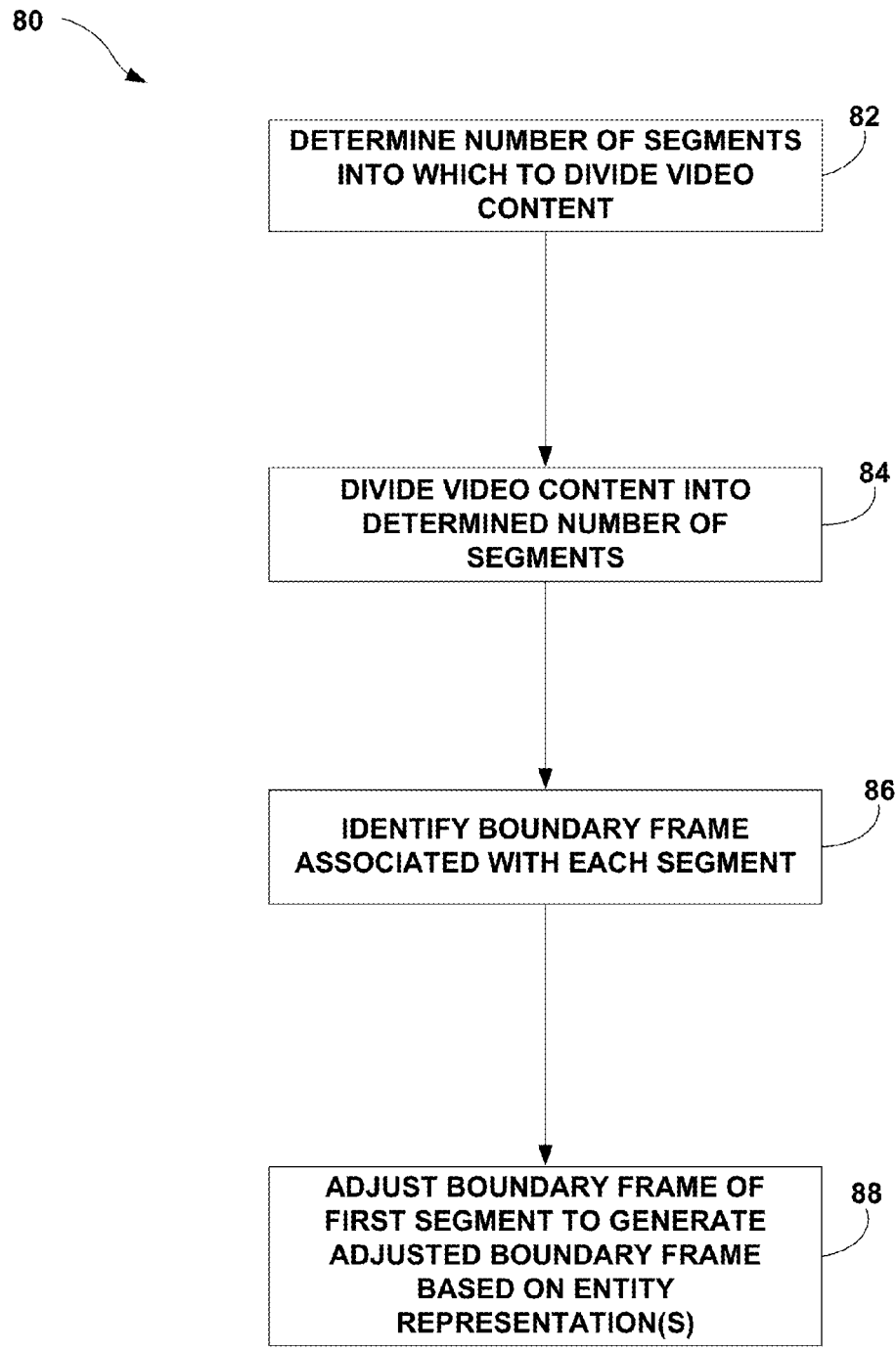
FIG. 4 is a flowchart illustrating another example process that a computing device may perform to segment video, in accordance with one or more aspects of this disclosure.

FIG. 4 is a flowchart illustrating another example process 80 that computing device 2 may perform to segment video, in accordance with one or more aspects of this disclosure. While process 80 may be performed by a variety of devices in accordance with the aspects of this disclosure, for purposes of clarity only, process 80 is described herein with respect to computing device 2 and components thereof, as illustrated in FIGS. 1-2.

Process 80 includes segmentation module 8 determining a number of segments into which to divide video content (82). The determined number may, in various examples, correspond to one or more segments. Additionally, segmentation module 8 may divide the video content into the determined number of segments (84). Boundary set module 50 of segmentation module 8 may identify a boundary frame associated with each of the segments (86). Additionally, boundary set module 50 may adjust the respective boundary frame associated with a first segment of the segments to generate an adjusted boundary frame associated with the first segment, where the adjusting is based on one or more entity representations associated with the adjusted boundary frame (88). Examples of an entity representation associated with a frame, as described herein, may include respective visual representation of one or more persons, such as actors or athletes, a visual representation of an inanimate object, such as a building, skyline, or landmark, or audible representations of various audio entities that are output in conjunction with the frame, such as a song or a voice of a narrator.

According to some examples, boundary set module 50 may adjust the respective boundary frame using the one or more entity representations, based on activity metrics module 48 determining an activity level associated with the adjusted boundary frame, the activity level being associated with a change in the one or more entity representations. For instance, activity metrics module 48 may the change in the one or more entity representations relative to a neighboring frame of the adjusted frame, in display order. In some examples, boundary set module 50 may adjust the respective boundary frame associated with the first segment based at least in part on activity metrics module 48 identifying, within a predetermined time span from the respective boundary frame associated with the first segment within the video, a frame with a greatest activity level among all frames within the predetermined time span, and boundary set module 50 identifying the frame with the greatest activity level as the adjusted boundary frame. In one such example, thumbnail selection module 10 may select the adjusted boundary frame associated with the first segment as a representative thumbnail frame for the first segment.

In some examples, activity metrics module 48 may identify the frame with the greatest activity level based at least in part on determining, by event detection module 44, at least one of (i) a number of actors entering a field of vision, and (ii) a number of actors leaving the field of vision, with respect to each frame of the predetermined time span within the first segment, where the field of vision is associated with a displayed portion of a corresponding frame within the first segment. In one such example, activity metrics module 48 may identify the frame with the greatest activity at least in part by identifying a particular frame within the predetermined time span within the first segment, such that the particular frame has, in comparison to all frames within the predetermined time span in the first segment, a greatest sum of the number of actors entering a field of vision and the number of actors leaving the field of vision as the frame with the greatest activity level.

In some examples, activity metrics module 48 may identify the frame with the greatest activity level based at least in part on identifying a particular frame within the predetermined time span within the first segment, such that the particular frame has, in comparison to a set of frames within the predetermined time span in the first segment, a greatest difference between the number of actors entering a field of vision and the number of actors leaving the field of vision as the frame with the greatest activity level.

According to some examples, boundary set module 50 may adjust the respective boundary frame associated with the first segment at least in part by adjusting the respective boundary frame to form the adjusted boundary frame associated with the first segment, such that the first segment is of unequal length to at least one other segment into which the video content is divided. In some examples, video tagging module 6 may identify one or more actors represented in the video content. According to some examples, the respective boundary frame and the adjusted boundary frame, each associated with the first segment, are a same frame. According to some examples, the respective boundary frame and the adjusted boundary frame are different frames. In some examples, segmentation module 8 may divide the video content into the determined number of segments, at least in part by dividing the video content such that all of the segments are of equal length.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium or computer-readable storage device encoded with instructions. Instructions embedded or encoded in an article of manufacture including an encoded computer-readable storage medium or computer-readable storage device, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media. In some examples, an article of manufacture may comprise one or more computer-readable storage media.

In some examples, computer-readable storage media may comprise a tangible or non-transitory media, such as one or more computer-readable storage devices. The term "non-transitory" may indicate that the storage medium is not embodied in a carrier wave or a propagated signal. In certain examples, a non-transitory storage medium or non-transitory computer-readable storage device may store data that can, over time, change (for example, in RAM or cache).

Various examples have been described. These and other examples are within the scope of the following claims.

What is claimed is:

1. A method comprising:
    determining, by a computing device, one or more segments into which to divide video content;
    dividing, by the computing device, the video content into the one or more segments;
    identifying, by the computing device, a respective boundary frame associated with each of the segments;
    identifying, by the computing device, a frame with a greatest activity level among a set of frames based on one or more entity representations associated with the set of frames, wherein each frame of the set of frames occurs within a predetermined time span from the respective boundary frame associated with a first segment of the one or more segments; and
    adjusting, by the computing device, the respective boundary frame associated with the first segment to generate an adjusted boundary frame associated with the first segment at least in part by identifying the frame with the greatest activity level as the adjusted boundary frame.

2. The method of claim 1, wherein identifying the frame with the greatest activity level comprises determining a respective activity level associated with each frame of the set of frames, each respective activity level being associated with a change in the one or more entity representations associated with respective frame of the set of frames.

3. The method of claim 1, wherein identifying the frame with the greatest activity level comprises:
    determining, by the computing device, at least one of (i) a number of actors entering a field of vision, and (ii) a number of actors leaving the field of vision, with respect to each frame of the predetermined time span within the first segment, wherein the field of vision is associated with a displayed portion of a corresponding frame within the first segment.

4. The method of claim 1, wherein identifying the frame with the greatest activity level comprises:

identifying, by the computing device, a particular frame within the predetermined time span within the first segment, such that the particular frame has, in comparison to all frames within the predetermined time span in the first segment, a greatest sum of the number of actors entering a field of vision and the number of actors leaving the field of vision as the frame with the greatest activity level.

5. The method of claim 1, further comprising:

selecting, by the computing device, the adjusted boundary frame associated with the first segment as a representative thumbnail frame for the first segment.

6. The method of claim 1, wherein adjusting the respective boundary frame associated with the first segment comprises:

setting, by the computing device, the respective boundary frame to form the adjusted boundary frame associated with the first segment, such that the first segment is of unequal length to at least one other segment into which the video content is divided.

7. The method of claim 1, further comprising:

identifying, by the computing device, one or more actors represented in the video content.

8. The method of claim 1, wherein the respective boundary frame and the adjusted boundary frame, each associated with the first segment, are a same frame.

9. The method of claim 1, wherein the respective boundary frame and the adjusted boundary frame are different frames.

10. The method of claim 1, wherein dividing the video content into the one or more segments comprises:

dividing the video content such that each of the one or more segments is of equal length.

11. A device comprising:

a memory; and one or more programmable processors operable to:

determine a number of segments into which to divide video content;

divide the video content into the determined number of segments;

identify a respective boundary frame associated with each of the segments;

identify a frame with a greatest activity level among a set of frames based on one or more entity representations associated with the set of frames, wherein each frame of the set of frames occurs within a predetermined time span from the respective boundary frame associated with a first segment of the one or more segments; and adjust the respective boundary frame associated with the first segment to generate an adjusted boundary frame associated with the first segment based at least in part on an identification of the frame with the greatest activity level as the adjusted boundary frame.

12. The device of claim 11, wherein, to identify the frame with the greatest activity level, the one or more programmable processors are operable to determine a respective activity level associated with each frame of the set of frames, each respective activity level being associated with a change in the one or more entity representations associated with the respective frame of the set of frames.

13. The device of claim 11, wherein, to identify the frame with the greatest activity level, the one or more programmable processors are operable to:

determine at least one of (i) a number of actors entering a field of vision, and (ii) a number of actors leaving the field of vision, with respect to each frame of the predetermined time span within the first segment, wherein the field of vision is associated with a displayed portion of a corresponding frame within the first segment.

14. The device of claim 11, wherein, to identify the frame with the greatest activity level, the one or more programmable processors are operable to:

identify a particular frame within the predetermined time span within the first segment, such that the particular frame has, in comparison to all frames within the predetermined time span in the first segment, a greatest sum of the number of actors entering a field of vision and the number of actors leaving the field of vision as the frame with the greatest activity level.

15. The device of claim 11, wherein the one or more programmable processors are further operable to:

select the adjusted boundary frame associated with the first segment as a representative thumbnail frame for the first segment.

16. The device of claim 11, wherein, to adjust the respective boundary frame associated with the first segment, the one or more programmable processors are operable to:

set the respective boundary frame to form the adjusted boundary frame associated with the first segment, such that the first segment is of unequal length to at least one other segment into which the video content is divided.

17. The device of claim 11, wherein the one or more programmable processors are further operable to:

identify one or more actors represented in the video content.

18. The device of claim 11, wherein the respective boundary frame and the adjusted boundary frame, each associated with the first segment, are a same frame.

19. The device of claim 11, wherein the respective boundary frame and the adjusted boundary frame are different frames.

20. A computer-readable storage device encoded with instructions that, when executed, cause one or more computing devices to perform operations comprising:

determining a number of segments into which to divide video content;

dividing the video content into the determined number of segments;

identifying a respective boundary frame associated with each of the segments;

identifying a frame with a greatest activity level among a set of frames based on one or more entity representations associated with the set of frames, wherein each frame of the set of frames occurs within a predetermined time span from the respective boundary frame associated with a first segment of the one or more segments; and adjusting the respective boundary frame associated with the first segment to generate an adjusted boundary frame associated with the first segment, at least in part by identifying the frame with the greatest activity level as the adjusted boundary frame.

* * * * *